United States Patent
Murphy et al.

(10) Patent No.: US 9,907,048 B2
(45) Date of Patent: Feb. 27, 2018

(54) MOBILE GEOLOCATION

(71) Applicant: Viavi Solutions UK Limited, Berkshire (GB)

(72) Inventors: Christopher Murphy, Bath (GB); Michael Joseph Flanagan, Chester, NJ (US); Peter Kenington, Chepstow (GB)

(73) Assignee: Viavi Solutions UK Limited, Berkshire (GB)

(*) Notice: Subject to any disclaimer, the term of this patent is extended or adjusted under 35 U.S.C. 154(b) by 0 days.

(21) Appl. No.: 15/254,603

(22) Filed: Sep. 1, 2016

(65) Prior Publication Data
US 2017/0064669 A1   Mar. 2, 2017

Related U.S. Application Data (63) Continuation of application No. 13/719,166, filed on Dec. 18, 2012, now Pat. No. 9,439,162.

(51) Int. Cl.
*H04W 64/00* (2009.01)
*G01S 5/02* (2010.01)
*H04W 56/00* (2009.01)

(52) U.S. Cl.
CPC ......... *H04W 64/006* (2013.01); *G01S 5/0252* (2013.01); *H04W 56/001* (2013.01); *H04W 64/00* (2013.01)

(58) Field of Classification Search
CPC ............... H04W 64/00; H04W 64/006; H04W 56/0001; G01S 5/0252
See application file for complete search history.

(56) References Cited

U.S. PATENT DOCUMENTS

| | | | |
|---|---|---|---|
| 8,874,133 B2 | 10/2014 | Flanagan et al. | |
| 9,078,228 B2 | 7/2015 | Flanagan | |

(Continued)

FOREIGN PATENT DOCUMENTS

| | | |
|---|---|---|
| EP | 2296398 | 3/2011 |
| WO | 2007091934 | 8/2007 |
| WO | 2010/083943 A1 | 7/2010 |

OTHER PUBLICATIONS

Khan, "Mobile Cellular Location Positioning: An Approach Combining Radio Signal Strength Propagation and Trilateration," A thesis submitted to the Faculty of Engineering and the Built Environment in fulfilment of the requirements for the Degree of Magister Ingeneriae in Electrical and Electronic Engineering Sciences at the University of Johannesburg, Nov. 2009, 161 pages.

(Continued)

*Primary Examiner* — Myron K Wyche
(74) *Attorney, Agent, or Firm* — Harrity & Harrity, LLP (57) ABSTRACT

A method and apparatus for generating reference signatures for use in geolocation in a cellular wireless communication system is provided. A first signature for a mobile communication unit comprises location information, a timestamp, and radio frequency measurement information obtained by a mobile communication unit at a location, but does not contain identification information for the mobile communication unit. The first signature is compared to signatures in a database, to identify a second signature that has a timestamp and radio frequency measurement information that correspond to those of the first signature. A reference signature is created by combining at least a part of the first signature with at least a part of the second signature. Repetition of the comparison and combination steps creates a database of reference signatures, for use in geolocating other received call signatures.

20 Claims, 8 Drawing Sheets

(56) References Cited

U.S. PATENT DOCUMENTS

| | | |
|---|---|---|
| 9,439,162 B2 | 9/2016 | Murphy et al. |
| 2006/0126556 A1 | 6/2006 | Jiang et al. |
| 2006/0170767 A1 | 8/2006 | Brassil |
| 2009/0181664 A1 | 7/2009 | Kuruvilla et al. |
| 2009/0325600 A1 | 12/2009 | Lee |
| 2011/0222475 A1 | 9/2011 | Hole et al. |
| 2012/0095958 A1 | 4/2012 | Pereira et al. |
| 2012/0245955 A1 | 9/2012 | Bari et al. |
| 2012/0252438 A1 | 10/2012 | Mehio et al. |
| 2012/0309336 A1 | 12/2012 | Tanaka et al. |
| 2013/0039194 A1 | 2/2013 | Siomina et al. |

OTHER PUBLICATIONS

European Telecommunications Standards Institute, "Universal Mobile Telecommunications System (UMTS); Universal Terrestrial Radio Access and Evolved Universal Terrestrial Radio Access (E-UTRA); Radio Measurement collection for Minimization of Drive Tests (MDT); Overall Description; Stage 2," 3GPP TS 37.320 version 11.1.0 Release 11, Nov. 2012, 23 pages.

European Telecommunications Standards Institute, "Digital cellular telecommunications system (Phase 2+); Universal Mobile Telecommunications System (UMTS); LTE; Telecommunication management; Subscriber and equipment trace; Trace control and configuration management," 3GPP TS 32.422 version 11.5.0 Release 11, Sep. 2012, 126 pages.

European Search Report for EP Application No. 13197797 dated Jun. 27, 2014, 4 pages.

MOBILE GEOLOCATION

CROSS REFERENCE TO RELATED U.S. APPLICATIONS

This application is a continuation of U.S. patent application Ser. No. 13/719,166, filed Dec. 18, 2012 (now U.S. Pat. No. 9,439,162), which is related to co-pending U.S. patent application Ser. No. 13/719,179, and also to co-pending U.S. patent application Ser. No. 13/719,189, both of which were filed Dec. 18, 2012, the disclosures of which are incorporated herein by reference in their entireties.

FIELD OF THE INVENTION

The field of the invention relates to a system and method for generating reference signatures in a mobile communication system.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™).

The $3^{rd}$ and $4^{th}$ generations of wireless communications, and in particular systems such as LTE, have generally been developed to support macro-cell mobile phone communications. Here the 'phone' may be a smart phone, or another mobile or portable communication unit that is linked wirelessly to a network through which calls are connected. Henceforth all these devices will be referred to as mobile communication units. "Calls" may be data, video, or voice calls, or a combination of these. An increasing proportion of communications involve data rather than voice, and are technically referred to as being a 'connection', rather than a 'call'.

Macro cells utilize high power base stations to communicate with wireless communication units within a relatively large geographical coverage area. The coverage area may be several square kilometers, or larger if it is not in a built-up area.

Typically, mobile communication units communicate with each other and other telephone systems through a network. In a 3G system, this is the 'Core Network' of the 3G wireless communication system, and the communication is via a Radio Network Subsystem. A wireless communication system typically comprises a plurality of Radio Network Subsystems. Each Radio Network Subsystem comprises one or more cells, to which mobile communication units may attach, and thereby connect to the network. A base station may serve a cell with multiple antennas, each of which serves one sector of the cell. Often a cellular wireless communication system is described as comprising two parts: the network; and the mobile communication units.

Figure 1:
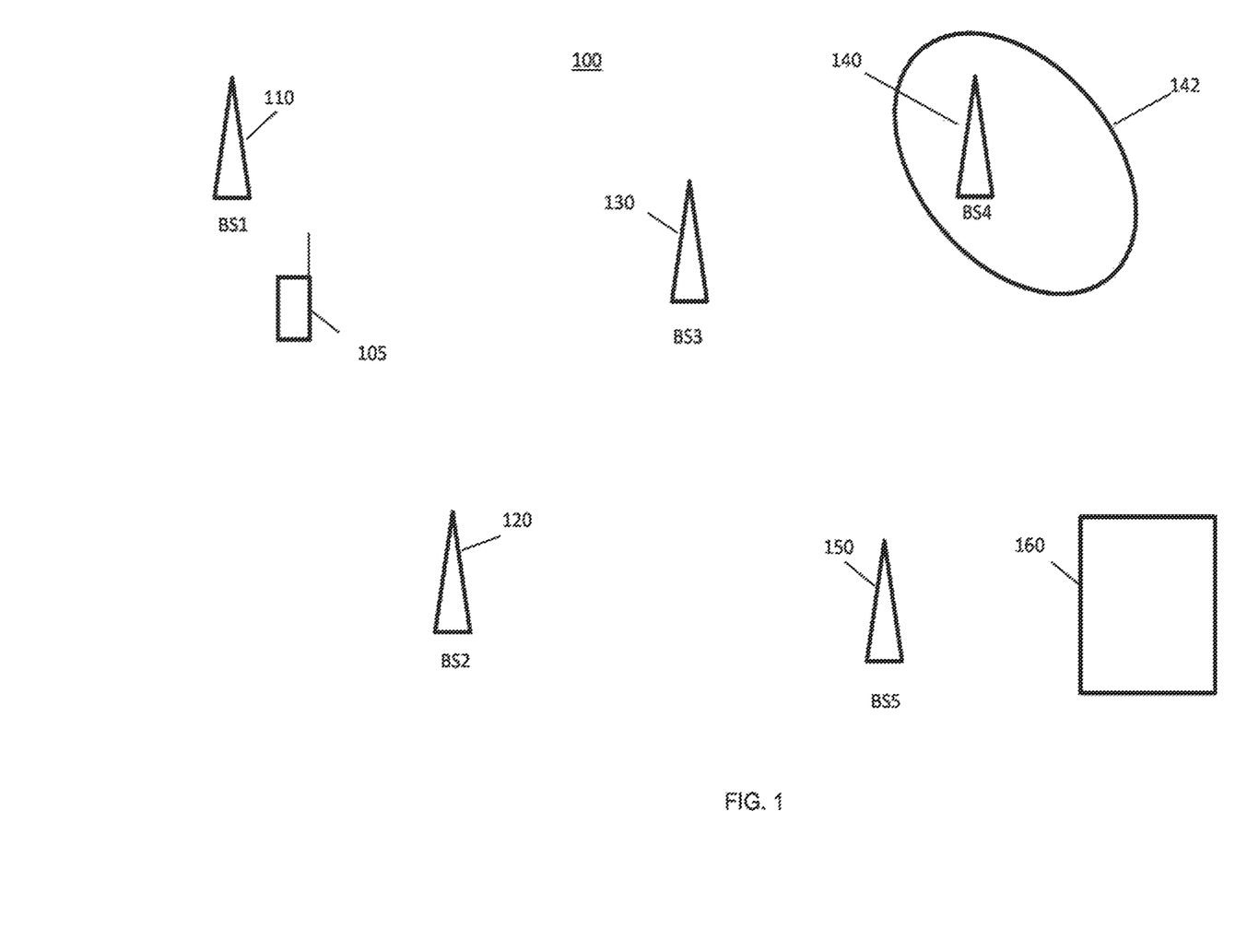
FIG. 1 is a schematic diagram, illustrating a prior art cellular wireless communication system.

FIG. 1 provides a perspective view of one prior art wireless communication system 100. The system of FIG. 1 comprises a network of base stations, comprising BS1 with reference 110, BS2 with reference 120, BS3 with reference 130, BS4 with reference 140 and BS5 with reference 150. Only one mobile communication unit 105 is shown. In a real network, there may be anywhere from thousands to millions of mobile communication units.

A base station such as base station 110 communicates with mobile communication unit 105. Base station 110 allows mobile communication unit 105 to place calls through the network, and receive calls routed through the network to base station 110.

Base station 140 has been shown as having a coverage area 142. If base station 140 had an omnidirectional antenna, and the terrain were flat, then coverage area 142 might be circular. However, both the shape and extent of the coverage areas of a typical base station depend on many variables, and may change with time.

Controller 160 manages calls within the wireless communication system 100. Controller 160 would be linked to all the base stations BS1-BS5, but the links are not shown in order to keep FIG. 1 simple to interpret. Controller 160 may process and store call information from the base stations shown in FIG. 1, plus many other base stations not shown in FIG. 1. In a UMTS network, controller 160 may be linked to the base stations via one or more Radio Network Subsystems.

There may be significant advantage in knowing where in wireless communication system 100 a mobile communication unit 105 is located. Prior art wireless communication systems have provided a variety of solutions to the problem of 'geolocating' mobile communication unit 105. One known solution involves providing specific equipment within the mobile communication unit that can measure location, such as a GPS unit. However, many users switch off the GPS function on their mobile communication units. Partly as a consequence, reported GPS details are highly infrequent. As little as one call in ten-thousand connections might report a GPS coordinate.

One prior art solution indicates that absolute power transmission levels can be used to geo-locate the mobile station. See for example "Mobile Cellular Location Positioning: An Approach Combining Radio Signal Strength Propagation and Trilateration", M. F. Khan, Masters Thesis, University of Johannesburg, November 2009 which is herein incorporated by reference in its entirety. However, power measurements in event-driven technologies, such as LTE, can be relatively infrequent. Even where a system or mobile communication unit has the capability of performing geolocation based on absolute power measurement, it may remain very important to make use of whatever alternate sources of information are also available.

Co-pending U.S. patent application Ser. No. 13/311,132, with applicant reference OPT004P326, which is herein incorporated by reference in its entirety, indicates that differential power levels can be used to geo-locate a mobile unit. A mobile communication unit provides a measurement of the difference in signal strengths that it receives from at least two base stations. The difference value can be compared to one or more contours of constant power difference, for signals received by subscriber mobile communication units in the system. An estimate of location can be obtained from this comparison. However, differential power techniques can be limited in scenarios where there are few pilot signals to make use of.

Patent application WO2010/083943A, which is also incorporated by reference in its entirety, shows a further technique, which uses signal strength and timing data derived from the mobile communication unit itself, along with network configuration data provided by the network operator, to locate the mobile communication unit.

Co-pending U.S. patent application Ser. No. 13/369,591, with applicant reference OPT004P330, and is hereby incorporated by reference in its entirety indicates that a database of 'known' signatures can be used to aid in locating a mobile communication unit operating in a mobile communication system. Each known signature comprises a location measurement or estimate, together with radio frequency and other measurements that were obtained by a mobile communication unit at that location at a particular time. Examples of the 'other measurements' that may be obtained by a mobile communication unit are: control information; a set of cells observable by the first mobile communication unit; and received power level information, for signals received from the observable cells.

The use of this database of known signatures enables position estimates to be derived, at least for any mobile communication devices that report similar values of the radio frequency and other measurements to those of a known signature. When a 'match' of such similar values is found, the mobile communication device concerned can therefore be assumed to be at the location at which the known signature was recorded.

U.S. patent application Ser. No. 13/369,591 also employs 'context information'. Context information links successive known signatures in the database. When two or more signatures are received from a mobile communication device whose location is unknown, those signatures can be correlated against two or more signatures in the database that are linked by context information.

The invention of U.S. patent application Ser. No. 13/369, 591 only allows the estimation of the position of a mobile communication device if there is a match between a known signature in the database and the values of the radio frequency and other measurements reported by that mobile communication device. This approach therefore relies on the database having many known signatures. For a cellular two-way radio system, the database may require hundreds of thousands or millions of known signatures. Obtaining these known signatures may be difficult. One approach is to collect signatures having location information by employing 'drive testing' and/or 'indoor-walk-testing'. Such testing relies on moving a test mobile communications device through a network, in order to collect accurate position measurements from the mobile communication device and at the same time measure, for those positions, the values of radio frequency and other measurements.

Drive-testing and indoor-walk-testing have the disadvantages that:

(i) Drive- and walk-test signatures may not be easily obtained in the areas most frequented by actual users. This is because some areas are not accessible for either drive- or walk-testing, such as private company premises.

(ii) Signatures can be expensive to obtain over extensive areas.

Signatures obtained from drive- or walk-testing can be augmented by selecting data from the Operation Support System (OSS) of the mobile communication system. The OSS holds measurements made by many or all of the subscriber mobile communication units that operate in a mobile communication system. Some or all of the calls made during drive- or walk-testing will result in a record being created in the OSS. In some systems, the record of the call from the test mobile communications device and the corresponding record from the OSS both contain identification information for the test mobile communications device, if this is the case, then the common identification information can be used. If the correct individual record can be retrieved from the OSS by matching its identification information with the identification information for the test mobile communications device used in the drive or walk testing, then the records can be combined. In particular, the record retrieved from the OSS may contain measurements made by the mobile communication system that can be added to the record of the same call that was made by the test mobile communications device itself as part of drive or walk testing.

Thus the identification information in both records allows the two records to be identified as being from the same mobile communication device. This may in turn then allow the two records to be synthesized into a more comprehensive signature than was obtained directly from the test mobile communications device.

Cellular wireless communication systems have faced the disadvantages that signatures may be expensive to obtain by known methods, and may not be representative of the areas where users make calls. Hence, there is a need for an improved method for generating reference signatures in a mobile communication system, such as s an LTE, GSM or UMTS network.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve under-standing of embodiments of the present invention.

DESCRIPTION OF THE ILLUSTRATIVE EMBODIMENTS

Before describing in detail embodiments that are in accordance with the present invention, it should be observed that the embodiments reside primarily in combinations of method steps and apparatus components related to a computer camera lighting system and method. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first as first and second, top and bottom, and the like may be used solely to distinguish one entity or action from another entity or action without necessarily requiring or implying any actual such relationship or order between such entities or actions. The terms "comprises," "compromising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints preclude the existence of additional identical elements in the process, method, article or apparatus that comprises the element.

A cellular wireless communication system and a method of generating reference signatures for use in geolocation in a cellular wireless communication system are provided. The cellular wireless communication system may, for example, operate in accordance with the GSM, UMTS or LTE standards.

A method of generating reference signatures for use in geolocation in a cellular wireless communication system comprises obtaining a first signature for a mobile communication unit, the first signature comprising location information, a timestamp and radio frequency measurements obtained by the mobile communication unit at the location, but not containing identification information for the mobile communication unit. The first signature is compared to signatures in a database, to identify a second signature of the plurality of signatures, the second signature having a timestamp and radio frequency measurement information that correspond to those of the first signature. Based on this comparison, a first reference signature is created by combining at least a part of the first signature with at least a part of the second signature. Creating the first reference signature may further comprise combining the location information of the first signature with at least a part of the second signature.

The location information of the first signature may be added into the database holding the second signature. The database holding the second signature may be the OSS database of a UMTS network. As a result of adding in the location information of the first signature, a reference signature may be created that has:

(i) location information;
(ii) a timestamp;
(iii) radio frequency measurements of the type available with the second signature;
(iv) radio frequency measurements of the type available with the first signature, if these are added to the database together with the location information of the first signature.

Repetition of the comparison and combination steps for many 'first signatures' creates a database of reference signatures. Those reference signatures may then be used to provide geolocation estimates for other received call signatures. By repeating the method of the invention, therefore, it is possible to enrich the signatures in the database. The resulting set of reference signatures in the database is then available for matching to a variety of other signatures, which do not contain a location measurement from the mobile communication unit that created the signature. These signatures may be received, after creation of the enriched database of signals, from mobile communication units whose current location is unknown but needed.

The second signature may comprise a user identifier, and at least one of the following types of control information not included in the first signature; timing advance; burst throughput rate; dynamic rate control comprising at least channel quality indicators; signal-to-noise ratio.

The first signature will typically have some radio frequency measurements. However, these measurements may cover fewer variables than are usually available for signatures in the OSS database of a UMTS network. The radio frequency measurements comprised in the first signature may comprise at least one selected from: signal quality; a cell identifier and corresponding observed power level. There may be more than one observed power level available, each for a corresponding cell.

A variety of sources may provide the first signature. However, the first signature may be taken from an anonymized call database. Such a database may contain large numbers of signatures, each with a location estimate. However, the signatures in the anonymized call database have been recorded without any identification of either the user or the mobile communication unit that made the call to which the signature relates. An example of an anonymized call database is a database compiled in accordance with the Minimization of Drive Test 3GPP standard. The 3GPP Minimisation of Drive Test standard is explained in standards documents 3GPP TS 37.320 and TS 32.422.

Anonymized call databases have hitherto been only of limited use. Such anonymised databases are 'rich' in location information about where a mobile communication unit was located when it made a call. However, they can be considered to be limited databases in the sense that they typically both:

(i) Lack user identity information; and
(ii) Provide only a relatively small amount of data, such as information only about received powers and serving cells.

The present invention links a 'first' signature from such an anonymised call database with another record of the same call by the same mobile communication unit, the other record being the second signature referred to above. Although the first signature has no identification information, it has sufficient information to enable the corresponding second signature to be identified as a 'match'. The second signature is in effect being identified and selected from among very many potential candidates in the database.

For example, the first signature may comprise a timestamp and a cell identifier. The precision of the timestamp recording (typically in milliseconds) and the uniqueness of the reported cells (typically using global cell identifiers) permit a matching between the first and second signatures. If, in another example, the first signature comprises a timestamp and an observed power level, then the precision of the timestamp and the precision of the RF measurement (typically in deciBels relative to a milliwatt, or dBm) also permit a matching between the first and second signatures.

At any given time in a large mobile communication system, a cell may serve hundreds, thousands or even tens of thousands of mobile communication units. In order to allow unique identification of records in such systems, the invention may comprise, for each of those cells, matching: (i) the timestamps of first and second signatures; (ii) information about multiple cells that could be observed; and (iii) either signal strengths or signal quality.

The type of information contained in a location-rich, information-poor database is often infrequently available, so the anonymised database is relatively sparsely populated. For example, there may only be entries for calls that occurred under certain RF-related handoff trigger conditions. The entries in the location-rich, information-poor anonymised database are created generally much less often than non-RF control data would be provided for calls. So only a subset of all calls will result in a signature being created in the anonymised database. In contrast to this, databases such as the OSS database of a UMTS system can be considered to be 'information-rich, but location poor', at least relative to the anonymised database. The OSS database may capture measurement and control events for every call. So, typically, entries are created in the OSS database much more often than entries in the anonymised database.

When the method of the invention is repeated, it may be possible to create a link between many, or possibly all, entries in the anonymised database and the corresponding signatures for the same calls in the 'information-rich, but location poor' database. Effectively, the two databases are being combined, to provide many new reference signatures. In one embodiment, the database of 'second' signatures can be augmented, by the addition of location information for each second signature, for which it has been possible to create a link to the corresponding first signature. This approach allows the construction of inexpensive, complex reference signatures through the linking of information in location-rich and information-rich databases. Those reference signatures can then be used for geolocation of other calls.

Figure 2:
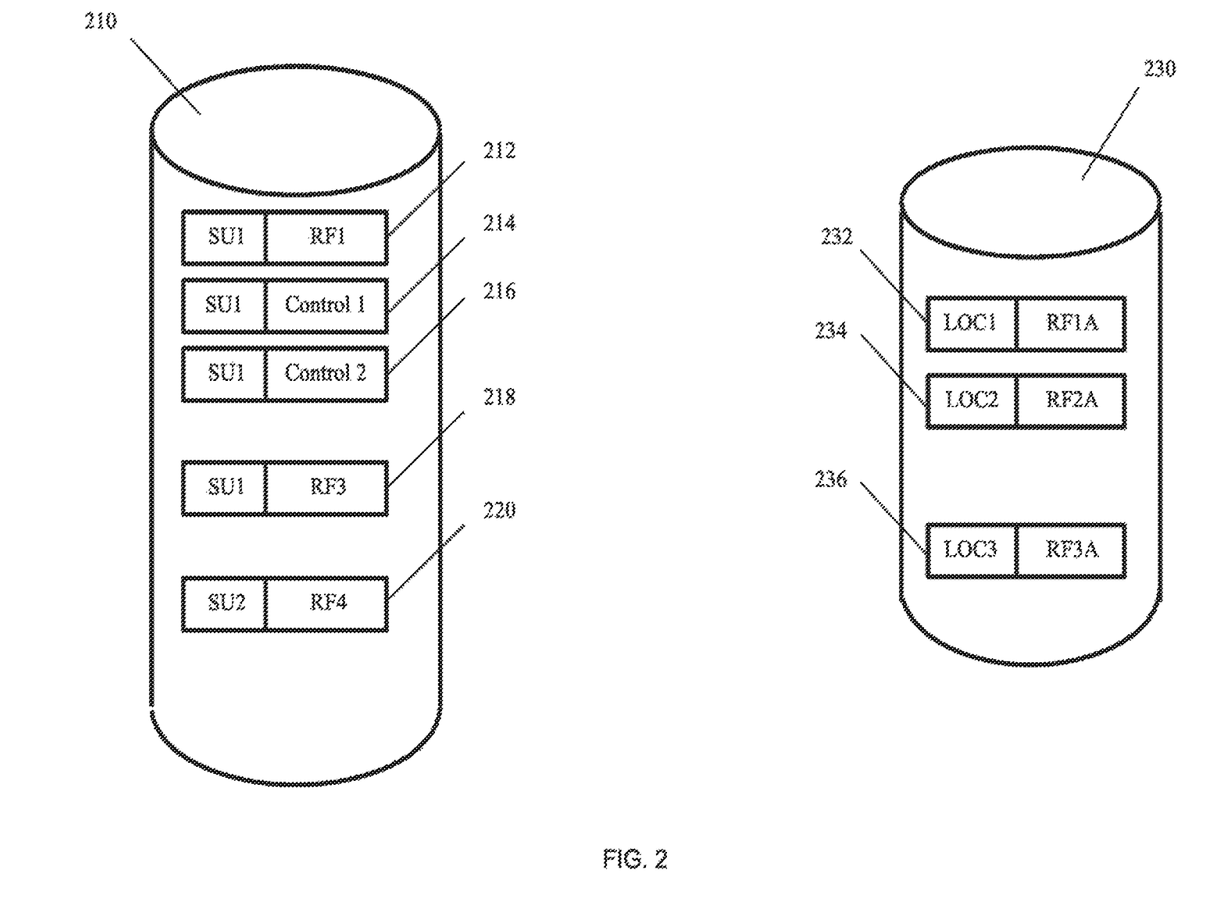
FIG. 2 is a schematic diagram, illustrating two databases for a cellular wireless communication system.

FIG. 2 provides an exemplary illustration of two databases. In this example, first database 210 comprises signatures 212, 214, 216, 218, 220. First database 210 may, for example, be the OSS database of a UMTS communications system. In a real UMTS communications system, first database 210 may comprise millions of entries, for even a 24 hour period in which calls or data connections are made in the mobile communications network.

The identification field is the first part of each signature in first database 210. The identification field may, for example, comprise the International Mobile Subscriber Identity (IMSI) number of the mobile communication unit concerned. Each of signatures 212, 214, 216, 218 represents information from the same mobile communication unit SU1, but at successively later time points. For each of signatures 212, 214, 216, 218, the identification field contains the same entry SU1, as each signature is for the same mobile communication unit SU1.

Each of signatures 212, 214, 216, 218 also comprises one or more further fields. Signatures 212 and 218 each include a second field, which contains RF measurements. Signature 212 has RF measurement RF1, and signature 218 has RF measurement RF3. Those measurements may typically include many of the following: timing advance; burst throughput rate; data throughput rate; dynamic rate control, comprising at least channel quality indicators; signal-to-noise ratio; a timestamp; a cell identifier; and an observed power level. Signature 218 might typically have been obtained somewhere in the range of 1-100 seconds after signature 212.

Signatures 214 and 216 were obtained after signature 212 but before signature 218. Each of signatures 214 and 216 includes a second field, which contains control information. Signature 214 has control information denoted as 'Control 1'. Signature 216 has control information denoted as 'Control 2'. However, signatures 214 and 216 do not include the detailed RF measurements that are included in signatures 212 and 218. Each of signatures 214 and 216 includes a timestamp.

Signature 220 is an example of one signature for a different mobile communication unit, SU2. So signature 220 has entry SU2 in its identification field. Signature 220 also includes RF measurement RF4. Signature 220 will not be considered in detail in relation to FIG. 2, and is provided to illustrate that the first database 210 has signatures for various different mobile communication units.

Mobile communication unit SU1, when in communication with the cellular network, will report various RF and control data in the life of a data connection or voice call. It is these report parameters that lead to the signatures 212, 214, 216, 218, which may all arise during one single call/connection involving SU1. Similarly, mobile communication unit SU2 will report various RF and control data in the life of one of its data connections or voice calls, which results in signature 220 and possibly several or many others, not shown. In a UMTS network, all of the signatures with RF and control data are placed in an Operations Support System (OSS) database, along with the user identity and timestamp details. So first database 210 may simply be the OSS database of a cellular network, or may alternatively be a dedicated/bespoke database.

Second database 230 is a location rich database, which is relatively poor in the information that it holds. Each signature in second database 230 does contain a location measurement. Each signature in second database 230 may contain a different and/or more limited set of RF measurements, than the RF measurements that form part of signatures 212, 218 and 220 in first database 210. Also, each signature in second database 230 does not contain information about the identity of the mobile communication unit that made the call, so second database 230 is an anonymised database.

Mobile communication unit SU1 may make many data connections and voice calls, each giving rise to a different set of signatures such as 212, 214, 216, 218 in first database 210. For one or more of these calls, mobile communication unit SU1 may also provide a report that is included in a second database 230. In the example shown in FIG. 2, there are three signatures in second database 230. Signatures 232 and 236 have both been recorded for mobile communication unit SU1. Signature 232 was recorded before signature 236. Both signatures 232 and 236 comprise a location estimate for mobile communication unit SU1.

Signature 232 contains location estimate LOC1, and RF information RF1A. Signature 232 is a record of measurements of the same call by mobile communication unit SU1 as signature 212 in first database 210, with both signatures 232 and 212 being made at the same timepoint. Thus at least some parts of the RF information RF1A contained in signature 232 will correspond closely to at least some parts of RF information RF1 in signature 212.

Signature 236 contains location estimate LOC3, and RF information RF3A. Signature 236 is a record of measurements for the same call by mobile communication unit SU1 as signature 218 in first database 210, with both signatures 236 and 218 being made at the same timepoint. Thus at least some parts of the RF information RF3A contained in signature 236 will correspond closely to at least some parts of information RF3 in signature 218.

A signature 234 is also recorded in second database 230, but relates to a third mobile communication unit SU3. Signature 234 was recorded after signature 232, but before signature 236. Signature 234 is included in this example only to show that second database 230 contains other signatures, from other mobile communication units than mobile communication unit SU1. Signature 234 contains location estimate LOC2 and RF information RF2A. Somewhere in first database 210 there may be one or more signatures, which are not shown on FIG. 2, which can be linked to signature 234.

Signatures 232, 234 and 236 in second database 230 may be recorded if, for example, mobile communication units are selected to contribute anonymously to a limited RF database. The limited RF database might be a 'Minimisation of Drive Test' database. The selection of the mobile communication unit and call or data connection might be done at random. The resulting signature recorded in second database 230 may comprise:

(i) location information, such as a location coordinate, which might be supplied by GPS;

(ii) some limited RF information, such as power levels and observed cells;

(iii) a timestamp.

Only when mobile communication unit SU1 is actively engaged in collecting 'Minimization of Drive Test' data, therefore, would it routinely provide location information such as that in signatures 232 and 236. Otherwise, when not engaged in collecting Minimization of Drive Test data, mobile communication units such as mobile communication unit SU1 might typically provide location information for only one out of every ten-thousand calls or data connections.

Known approaches, such as that in copending application Ser. No. 13/369,591, could be applied just to the entries in a location rich, information poor database such as second database 230. However:

(i) Those entries may only include limited RF parameters. The parameters might be just observed cells and observed power levels.

(ii) There would be relatively few entries. A location rich, information poor database is infrequently populated, because generation of these RF measurement reports is triggered by relatively infrequent call events or RF conditions.

(iii) The entries would not contain more-frequently-available non-RF control information, such as CQI, burst rate, etc.

(iv) The context of each RF measurement would be lost, due to the anonymous recording that is employed. The "context" is defined as preservation of temporal order of signatures and association with the same mobile communication unit. This is explained in greater detail in copending U.S. application Ser. No. 13/369,591.

Known approaches do not make a link between signatures in location poor, information rich databases such as first database 210, and location rich, information poor databases, such as second database 230.

The invention utilizes the fact that a location poor, information rich database, such as first database 210 or an OSS database, would contain all of the RF parameters that were sent to the limited RF database and much more. The extra information in first database 210, such as user identity and non-RF control information, is not typically stored with location information, but the invention may enable retrieval of the relevant location information from the location rich, information poor databases, such as second database 230.

Figure 3:
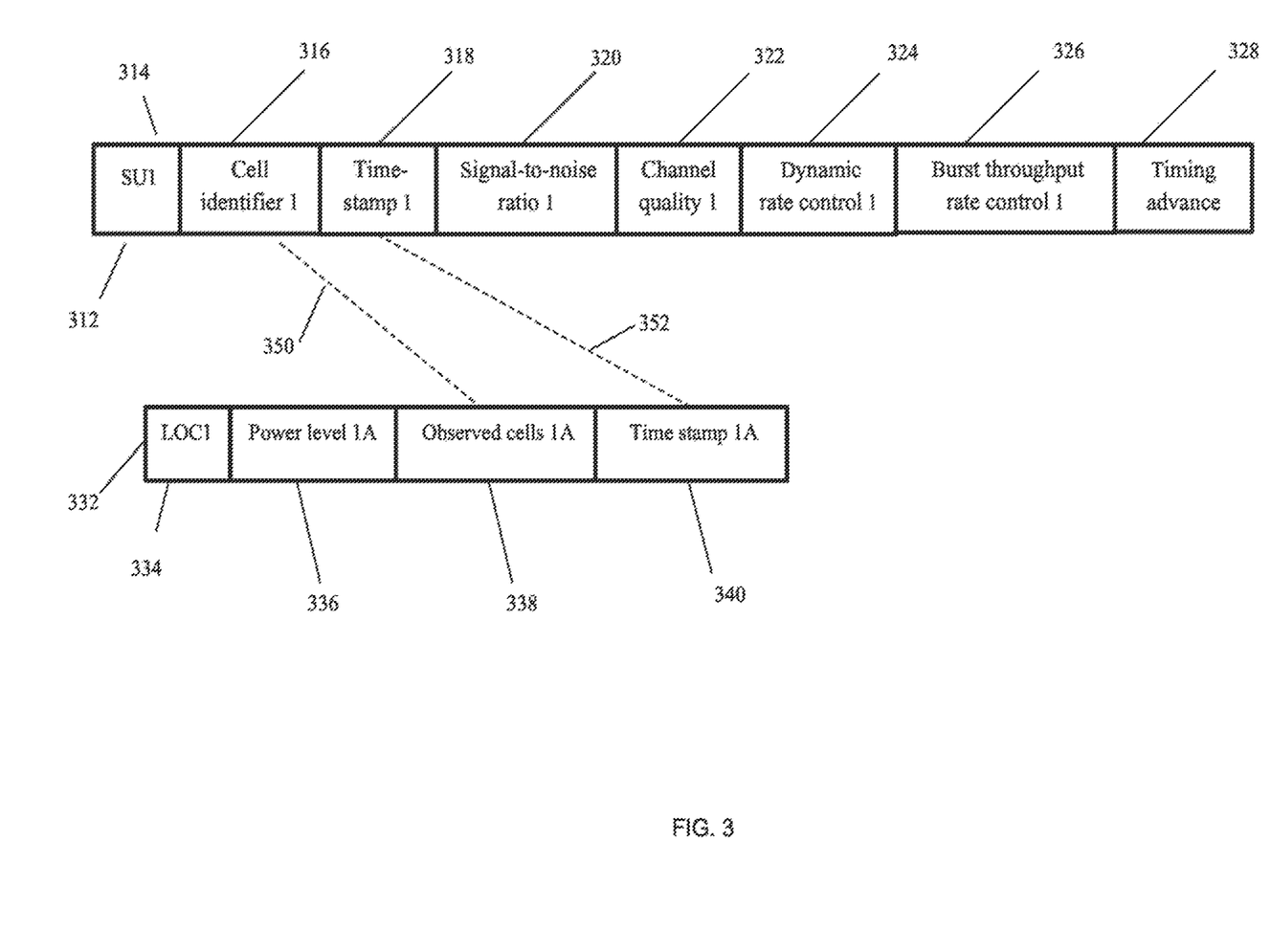
FIG. 3 provides more detail of the signatures in the first and second databases of FIG. 2.

FIG. 3 provides more detail of signature 212 from first database 210, and signature 232 from second database 230. These are represented in FIG. 3 as signature 312 and signature 332, respectively.

Signature 312 from first database 310 has been illustrated as comprising multiple measurements. Each of these measurements has suffix 1, to conform to the suffix RF1 used in FIG. 2 for signature 212. Signature 332 from second database 330 has been illustrated as comprising multiple measurements. Each of these measurements has suffix 1A, to conform to the suffix RF1A used in FIG. 2 for signature 232.

Signature 312, in this example, comprises: Cell identifier 1, reference 316; Timestamp 1, reference 318; Signal-to-noise ratio 1, reference 320; Channel quality indicator 1, reference 322; Dynamic rate control 1, reference 324; Burst throughput rate control 1, reference 326; Timing advance 1, reference 328. Signal to noise ratio and channel quality indicator are examples of quantities used in 'dynamic rate control'. However, the dynamic rate control shown by reference 324 may be based on other parameters than signal to noise ratio and channel quality indicator.

Signature 332, in this example, comprises: Location information LOC1, reference 334; Power level 1A, reference 336, Observed cells 1A, reference 338; Timestamp 1A, reference 340.

When a mobile communication unit provides measurements, it will typically be able to see more than one cell. So, typically, there will be a power level associated with each observed cell. Signature 312 will therefore comprise further measurements corresponding to those shown as references 320-328, but for a second cell and other cells. Those additional measurements are not shown on FIG. 3. Similarly, signature 332 will comprise additional measurements corresponding to the power level measurement in reference 336, but for the second and other cells. FIG. 3 has only been drawn to illustrate measurements for a first cell.

Signature 312 and signature 332 may be linked by using the overlapping timestamp and RF measurements held in the two signatures. The timestamp recording is precise, and may typically be recorded in milliseconds. The precision of the RF measurement recordings is also high, with recordings typically in deciBels relative to a milliwatt, or dBm, in addition, the uniqueness of the reported cells may be used, with the cells typically being identified using global cell identifiers. When such links can be established, there is a very high likelihood that signature 312 and signature 332 were created by the same mobile communication unit at the same time. So, with a high degree of confidence, the location information of signature 332 can be added into signature 312, and/or other parts of signature 312 and signature 332 can be combined, to generate a useable new reference signature.

By checking one or more of the Power level 1A, Observed cells 1A and Timestamp 1A of signature 332 against signatures in first database 210, it is therefore possible to identify that signature 332 was made by the same mobile communication unit SU1 as signature 312. In the example shown in FIG. 3, dotted line 350 indicates that Observed cells 1A of the signature 332 are found to match Cell identifier 1 of signature 312. Here a 'match' may be an exact correspondence, or a high degree of correlation. Similarly, dotted line 352 indicates that Timestamp 1A of the signature 332 is found to match Timestamp 1 of signature 312. In a lightly loaded network, for example, the invention may make a match between signatures 332 and 312 using just the timestamp and cell ID information, in a more heavily loaded network, the invention may match the timestamps, the power levels and the observed cells for multiple cells, in order to match signatures 332 and 312.

In the example shown in FIG. 3, there is more than enough data in signature 332 to link it to signature 312. When such links are also created for other signatures in second database 230 to other signatures in first database 210, it may be possible to link many or even all of the signatures in second database 230 to their corresponding signatures in first database 210. Thus the invention may lead to a straightforward matching between signatures a location poor, information rich database, such as first database 210, and many or all signatures in a location rich, information poor database, such as second database 230.

Similar links to those shown in FIG. 3 for signatures 332 and 312 may also be found between measurements of parameters in signature 236 from first database 210 and signature 218 from second database 230.

Figure 4:
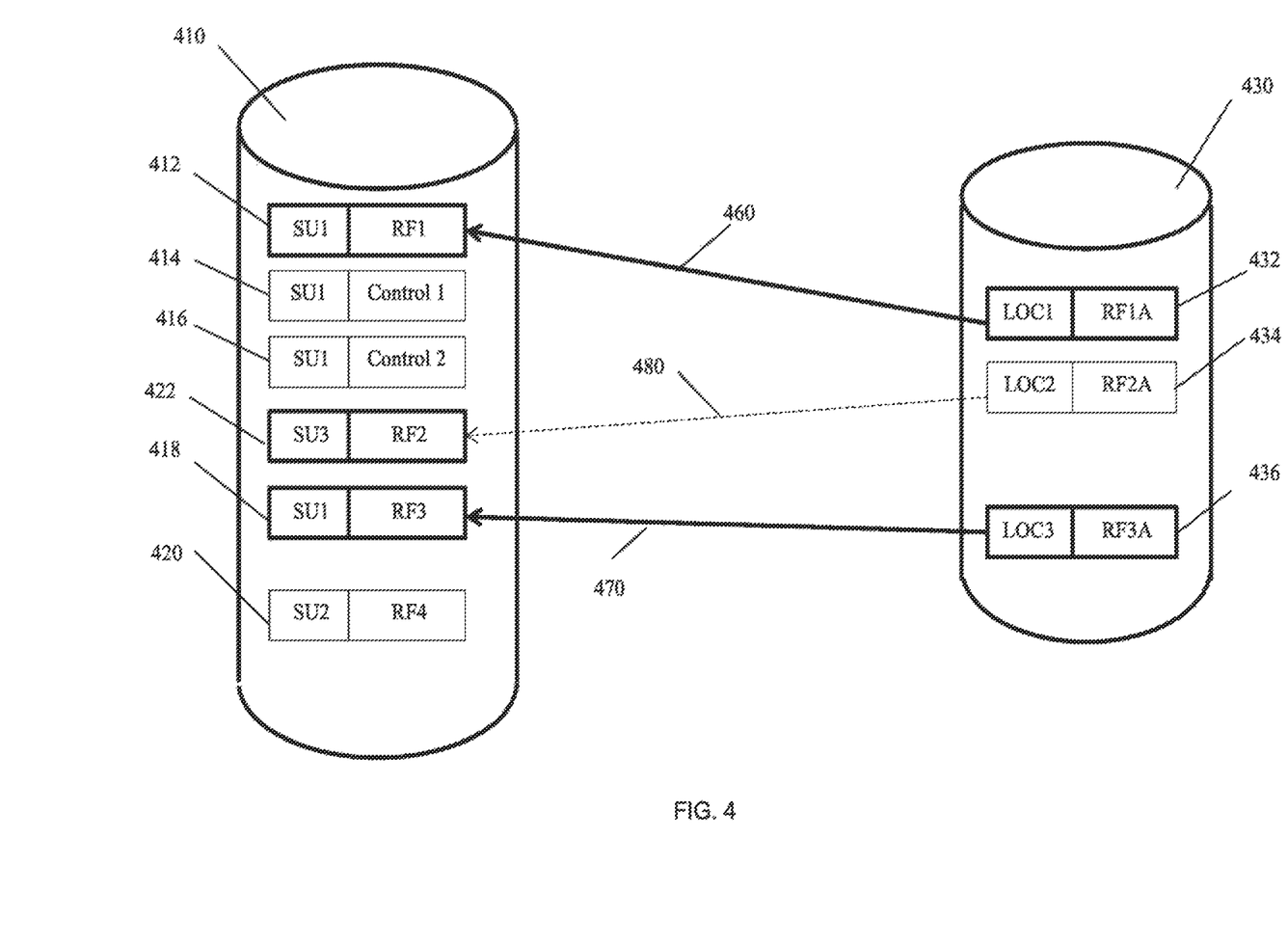
FIG. 4 illustrates links that may be created between corresponding signatures in the databases of FIG. 2.

FIG. 4 illustrates an example of the overall result that may be achieved. Signatures 412 and 432 of FIG. 4 correspond to signatures 212 and 232 of FIG. 2. Signatures 418 and 436 correspond to signatures 218 and 236 of FIG. 2. The remaining reference numbers on FIG. 4 that correspond to those of FIG. 2 indicate similar elements to those in FIG. 2.

FIG. 4 shows links made between signatures 412 and 432, and between signatures 418 and 436. Reference 460 shows the link between signatures 432 and 412. Reference 470 shows the link between signatures 436 and 418.

First database 410 also shows an additional signature with reference 422. Signature 422 is for mobile communication unit SU3, which was referred to in the discussion of FIG. 2. The method may create a link 480 between signature 434 in second database 430 and signature 422. Link 480 may be based on the correlation between the measurements that make up signatures 434 and signature 422. Those measurements include RF information RF2A within signature 434 and RF information RF2 in signature 422. Signature 434 may comprise measurements of the types indicated at references 336, 338 and 340 in FIG. 3 for signature 332. Signature 422 may comprise measurements of the types indicated at references 316, 318, 320, 322, 324, 326, 328 in FIG. 3 for signature 312. Some or all of the measurements that make up signature 434 may match exactly or correlate well with the corresponding fields of signature 422.

Figure 5:
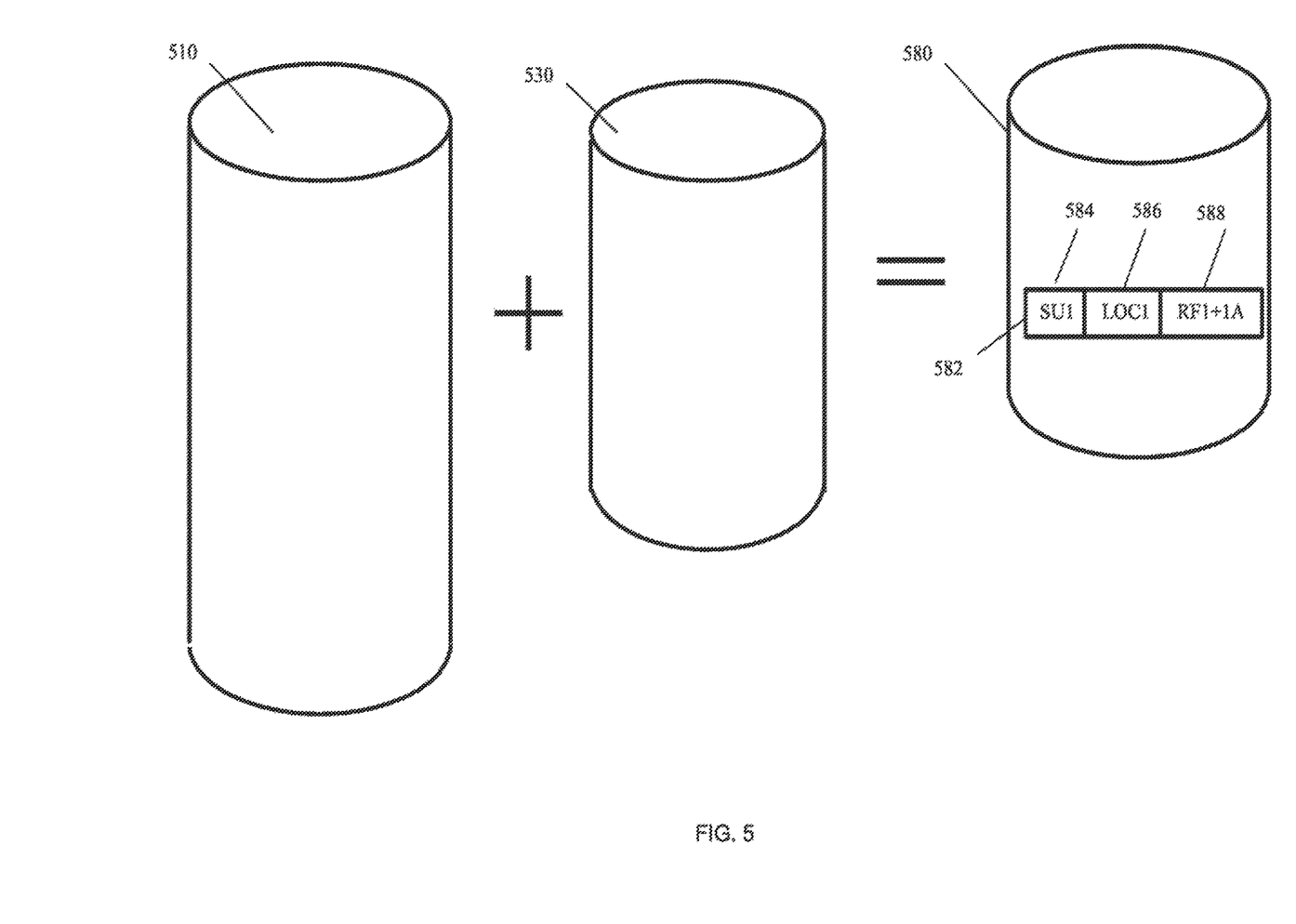
FIG. 5 illustrates the creation of a database of reference signatures.

FIG. 5 illustrates in general terms the combining of first database 210, or 410, and second database 230, or 430. This is achieved by linking many signatures from database 230, 430 to corresponding signatures in database 210, 410. First database 510 is illustrated as being added to second database 530 to form a database 580 of reference signatures. One reference signature 582 is shown in database 580. Reference signature 582 is a synthesis of signatures 212 and 232.

Reference signature 582 comprises field 584, which indicates the identity information of mobile communication unit SU1 from signature 212. Field 586 indicates the location 'LOC1' from reference signature 232. Field 588 generally indicates, as RF1+1A, a synthesis of the other measurements from the two signatures 212 and 232. Field 588 may comprise measurements derived from all the fields shown as 316, 318, 320, 322, 324, 326, 328 and 336, 338 and 340 in FIG. 3. The identity of the mobile communication unit may be useful in identifying locations for signatures such as 414 and 416 in database 410 of FIG. 4. However, reference signature 582 may, in an alternative embodiment, be stored in database 580 without field 584 indicating the identity of the mobile communication unit SU1 from signature 212.

Although the database 580 of reference signatures is shown separately from both first database 510 and second database 530, this is not necessarily the case. When location estimates from second database 530, plus other measurement information from signatures in second database 530, are added into first database 510, it may be first database 510 that eventually stores the reference signatures. This approach may convert a pre-existing OSS database into a database of reference signatures, for example. Alternatively, when data from the signatures in first database 510 is added into the corresponding signatures in second database 530, it will be second database 530 that eventually stores the reference signatures.

Due to the nature of RF noise and the random sequencing of independent events, it is highly improbable that two different mobiles would report seeing exactly the same cells at exactly the same power levels at exactly the same time.

Therefore, this permits unique identification of a user in first database 510, such as an OSS database, with a very high degree of confidence, as described above. By extension, the location from the second database 530, such as an anonymised limited RF database, can then be applied to the first database 510, for that user at that particular point in time. Other locations associated with any given user can be similarly applied to the signatures in the first database 510. Hence it is possible to create multiple location estimates for one mobile communication unit SU1, at different times. However, further information may be derived, as is explained in connection with FIG. 6 below.

Figure 6:
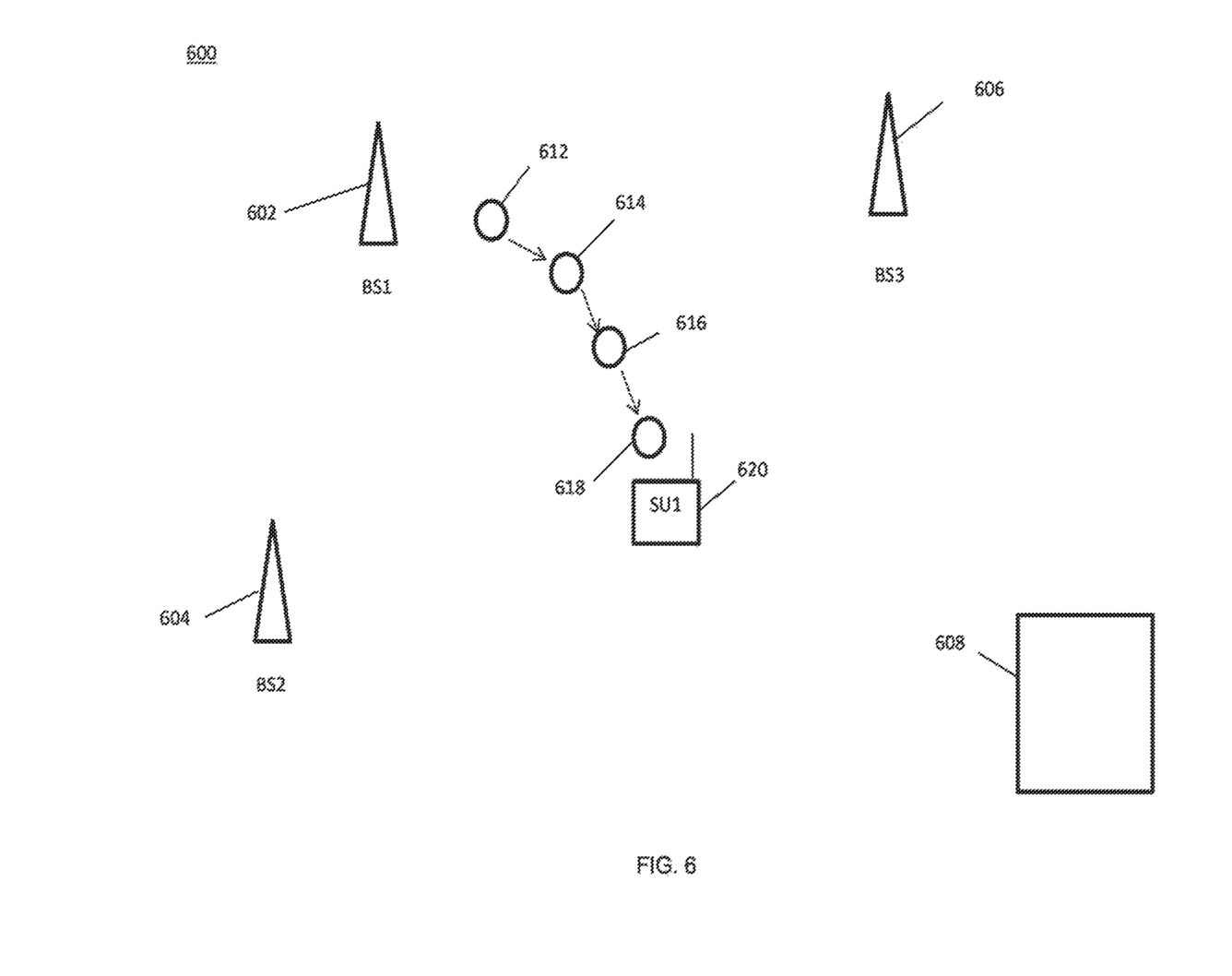
FIG. 6 illustrates locations at which signatures are recorded in a mobile communication system of an embodiment.

FIG. 6 illustrates a mobile communication system 600 in accordance with an embodiment of the invention. Mobile communication system 600 comprises base station BS1 with reference 602, base station BS2 with reference 604 and base station BS3 with reference 606. Controller 608 is linked to each of the base stations, and may function to implement the method of the invention. Alternatively, other elements of the mobile communication system 600 may implement all or part of the method of the invention.

The method of FIGS. 2-5 leads to a database 580 with location estimates for signatures such as signatures 212 and 218 in FIG. 2. However, first database 510 also contains other entries, such as signatures 214 and 216, which do not contain full RF information, but have only control information. The time stamps of entries in first database 210 show that signatures 214 and 216 are 'intervening events', since they occurred after signature 212 but before signature 218. However, the method described above has provided location estimates for the signatures 212 and 218. Each of signatures 214 and 216 can now have a location associated with it. This may be achieved either by interpolating between the locations obtained for signatures 212 and 218, or by extrapolating from the location of one of signatures 212 and 218.

FIG. 6 shows four successive locations 612, 614, 616 and 618 for a mobile communication unit 620. Mobile communication unit 620 is mobile communication unit SU1, which was discussed in connection with FIGS. 2-5 above. When mobile communication unit 620 was at location 612, it provided reference signatures 212 and 232. When mobile communication unit 620 was at location 618, it provided reference signatures 218 and 236. The method described previously has therefore provided location estimates 'LOC1' for location 612 and 'LOC3' for location 618.

When mobile communication unit 620 was at location 614, it provided signature 214. When mobile communication unit 620 was at location 616, it provided signature 216. First database 210 only has control information as part of signatures 214 and 216. However, an estimate of locations 614 and 616 can still be made, by extrapolating between the locations LOC1 and LOC3. For example, the total time difference between the timestamps for reference signatures 212 and 218 can be found by subtraction. Likewise, the spatial separation between locations LOC1 and LOC 3 can be found. Location 614 can then be estimated by dividing up the spatial separation between locations LOC1 and LOC 3 in the same proportion as the ratio of (time difference between the timestamp of reference signatures 212 and 214, divided by total time difference between the timestamps for reference signatures 212 and 218).

In an illustrative numerical example, the time difference between the timestamps for reference signatures 212 and 218 may be 10 seconds. The spatial separation between LOC1 and LOC 3 may be 30 meters. If the timestamp of reference signature 214 is 2 seconds after the timestamp of reference signature 212, then $\frac{1}{5}^{th}$ (i.e. 20%) of the total time between recording reference signatures 212 and 218 had elapsed when reference signature 214 was recorded. The distance of 30 meters can be divided up in a similar ratio. So we can estimate that location 214 is 30/5=6 meters from location 'LOC1'. Without other directional information, we would assume that the location 614 lies in the same direction from location 'LOC1' as does 'LOC3'.

In a further illustrative numerical example, assume again that the time difference between the timestamps for reference signatures 212 at location 612 and 218 at location 618 is 10 seconds, and the spatial separation between LOC1 and LOC 3 is 30 meters. If the timestamp of reference signature 216 at location 616 is 6 seconds after the timestamp of reference signature 612, then 6/10ths (i.e. 60%) of the total time between reference signatures 212 and 218 had elapsed when reference signature 216 was recorded. The distance of 30 meters can be divided up in a similar ratio. So we can estimate that location 616 is (30×6)/10=18 meters from location 'LOC1'. Without other directional information, we would assume that the location 616 lies in the same direction from location 'LOC1' as does 'LOC3'. So location 616 is 18 meters from 'LOC1' and 12 meters from 'LOC3', on a line joining LOC1 and LOC 3.

Figure 7:
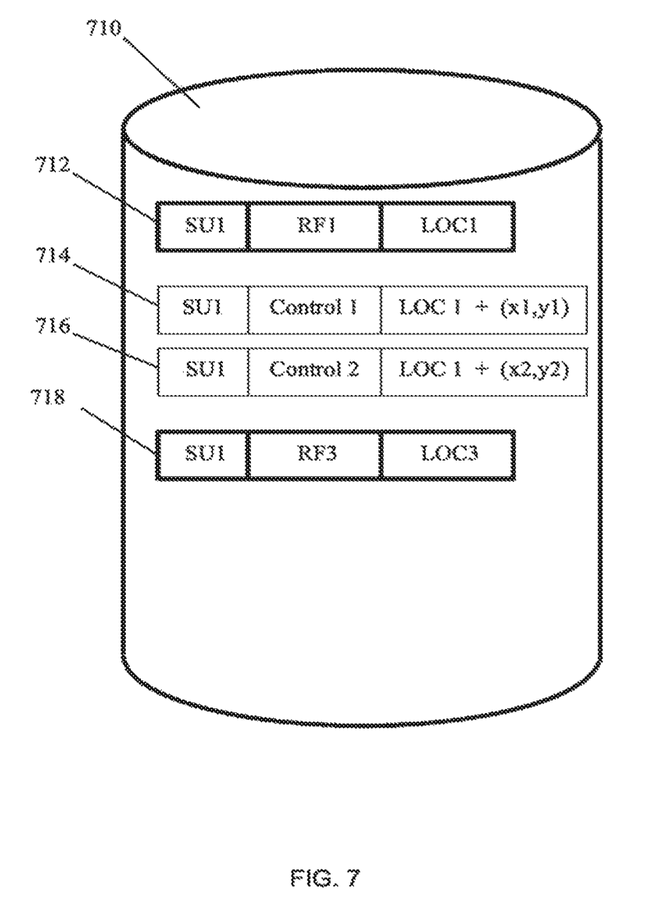
FIG. 7 illustrates a further embodiment of a database of reference signatures.

FIG. 7 illustrates the estimates discussed above in connection with FIG. 6. In the embodiment of FIG. 7, first database 210 is illustrated again, as a database with reference 710. However, the reference signatures derived from signatures 212 and 232 and from 218 and 236 have now been stored in first database 210, to provide a database 710 of reference signatures. This is an alternative approach to the creation of database 580 in FIG. 5. Signature 712 is a synthesis of signatures 212 and 232, and has location information 'LOC1'. So reference signature 712 comprises similar data to that of reference signature 582 in FIG. 5. Reference signature 718 is a synthesis of reference signatures 218 and 236, and has location information 'LOC3'.

Reference signature 714 is based on reference signature 214. However, the extrapolation approach explained above with reference to FIG. 6 has led to a location estimate for reference signature 714 of: LOC 1+(x1,y1)

Here x1 is a change in x co-ordinate that represents the displacement along the x axis of location 614 relative to LOC1. Similarly, y1 is the displacement along the y axis of location 614 relative to LOC1. If height data were available, then a further term z1 would indicate any change in altitude between location 614 and location 612. Analogously for signature 716, x2 and y2 represent the displacements of location 616 from LOC1.

FIG. 7 has four reference signatures, each comprising location information. However, the four location estimates all derive from the two location estimates 'LOC1' and 'LOC3', which were part of just the two signatures 232 and 236 of FIG. 2. FIG. 7 illustrates how interpolation or extrapolation of location information may lead to the creation of more useable reference signatures than there were signatures in the anonymised database 230.

As has been described above, a location-rich but information-poor database can be used in concert with an information-rich but location-poor database. The resultant database of reference signatures may then aid in geolocating other calls or connections, which do not comprise location information. Arbitrarily complex reference signatures may be generated. These signatures may involve not just Radio Frequency (RF) terms, but other control information terms as well, including Channel Quality Index (CQI), burst rate, serving cell, etc. This permits the construction of reference signatures with location information that are arbitrarily complex in the following sense:

(i) They combine RF data with non-RF control data such as CQI, burst rate, etc.; and (ii) They preserve the context of different reference signatures as an aid to geo-location.

This approach also ensures that the constructed reference signature database 580, 710 is of great relevance, from a user's perspective. This is the case, because the reference signature database 580, 710 is constructed using randomly selected users. Over time, areas within a mobile communication system 600 that are more frequented by users will tend to be better represented in the reference signature database. This is in contrast to some known drive-test-based strategies, which may be unable to focus on the areas where users are more commonly located.

The advantages of the invention may therefore include some or all of:

(i) Efficient, cost-effective generation of arbitrarily complex reference signatures;

(ii) Ensuring that highly relevant user locations are well-represented in the reference signature database 580, 710;

(iii) Use of the standardized MDT feature from 3GPP, although any suitably limited location rich database could be used.

(iv) Use of interpolation or extrapolation to provide more reference signatures with location estimates than there were 'first' signatures with actual location measurement data.

The method can be applied to many cellular telecommunications technologies that provide databases that are location-rich but information-poor, as well as databases that are information-rich but location-poor. Note-worthy examples are LTE and UMTS.

Figure 8:
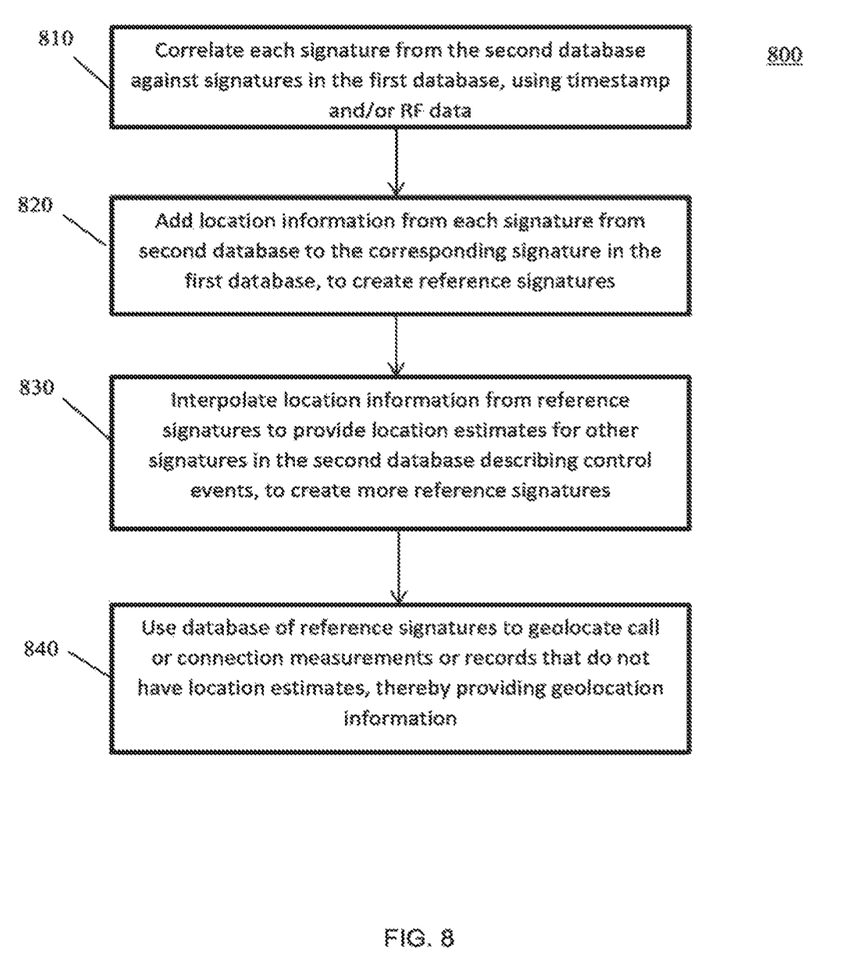
FIG. 8 is a flowchart of a method of creating and using a database of reference signatures.

FIG. 8 summarizes both the creation of the reference signature database 580, 710, and its use in a method of geolocation.

In step 810, each signature from second database 230 is correlated or otherwise compared with signatures in first database 210.

In step 820, once a match has been achieved, the location information from each signature in second database 230 is added to the information for the corresponding signature in first database 210.

In step 830, location information is estimated for those signatures in the first database that comprise detail of control events. This extrapolation step may, for example, more than double the number of reference signatures that include a location estimate.

At the end of step 830, a database 580 or 710 of reference signatures is available. This database can be used in methods such as that explained at length in U.S. application Ser. No. 13/369,591.

Step 840 illustrates this use. In step 840, a signature is identified that lacks location information. This 'unknown' signature may be a record of a call reaching first database 210, when first database 210 is the OSS database of a UMTS mobile communication system. The unknown signature may be compared to the reference signatures in database 580 or 710 of reference signatures. When the RF and other measurements in the unknown signature are close enough to those of one of the reference signatures in database 580 or 710 of reference signatures, the location information of that reference signature from database 580 or 710 may be taken to be an estimate of the location of the mobile communication unit that provided the unknown signature.

The 'unknown' signature processed in step 840 may be a newly arrived signature, which was received after the signatures that make up database 580 or 710 of reference signatures. However, the unknown signature may have been recorded prior to some of the reference signatures in database 580 or 710 of reference signatures. This may be the case, when an attempt is made to geolocate an unknown signature obtained days or even weeks before the reference signatures in database 580 or 710 were captured.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method comprising:
   obtaining, by a device, a signature associated with a mobile communication unit,
      the signature including identification information of the mobile communication unit, non-radio frequency control information, and a first timestamp,
      the signature not including location information,
   identifying, by the device, a first reference signature in a reference signature database based on the identification information,
      the first reference signature including first location information, a second timestamp indicating a time before the first timestamp, and radio frequency information,
   identifying, by the device, a second reference signature in the reference signature database based on the identification information,
      the second reference signature including second location information, a third timestamp indicating a time after the first timestamp, and radio frequency information,
   interpolating, by the device, the first location information from the first reference signature and the second location information from the second reference signature to provide a location estimate associated with the signature,
   creating, by the device, a third reference signature by combining information identifying the location estimate and at least a part of the signature,
      the third reference signature being for use in geolocation in a wireless communication system.

2. The method of claim 1, further comprising:
   adding the third reference signature to the reference signature database.

3. The method of claim 1, where the signature is obtained from a first database that includes signatures that do not include location information, and
   where the first reference signature and the second reference signature are created by combining signatures from the first database with anonymized signatures of a second database,
      the anonymized signatures including location information.

4. The method of claim 3, where the first database is an Operation Support System database of the wireless communication system.

5. The method of claim 1, where the non-radio frequency control information includes at least one of:
   channel quality index information,
   burst rate information, or
   serving cell information.

6. The method of claim 1, where the interpolating includes:
   determining a spatial separation between a first location, indicated by the first location information, and a second location, indicated by the second location information,
   generating the location estimate based on:
      the spatial separation, and
      a ratio of a first time difference between the first timestamp and the second timestamp and a second time difference between the second timestamp and the third timestamp.

7. The method of claim 1, where the third reference signature includes the identification information of the mobile communication unit, the non-radio frequency control information, and the information identifying the location estimate.

8. A device comprising:
   one or more processors to:
      obtain a signature associated with a mobile communication unit,
         the signature including identification information of the mobile communication unit, non-radio frequency control information, and a first timestamp,
         the signature not including location information,
      identify a first reference signature in a reference signature database based on the identification information,
         the first reference signature including first location information, a second timestamp indicating a time before the first timestamp, and radio frequency information,
      identify a second reference signature in the reference signature database based on the identification information,
         the second reference signature including second location information, a third timestamp indicating a time after the first timestamp, and radio frequency information,
      interpolate or extrapolate at least one of the first location information from the first reference signature or the second location information from the second reference signature to provide a location estimate associated with the signature,
      create a third reference signature by combining information identifying the location estimate and at least a part of the signature,
         the third reference signature being for use in geolocation in a wireless communication system.

9. The device of claim 8, where the one or more processors are further to:
   add the third reference signature to the reference signature database.

10. The device of claim 8, where the signature is obtained from a first database that includes signatures that do not include location information, and
    where the first reference signature and the second reference signature are created by combining signatures from the first database with anonymized signatures of a second database, the anonymized signatures including location information.

11. The device of claim 10, where the first database is an Operation Support System database of the wireless communication system.

12. The device of claim 8, where the non-radio frequency control information includes at least one of:
    channel quality index information,
    burst rate information, or
    serving cell information.

13. The device of claim 8, where the one or more processors, when interpolating or extrapolating, are to:
    interpolate the first location information from the first reference signature and the second location information from the second reference signature to provide the location estimate associated with the signature.

14. The device of claim 8, where the one or more processors, when interpolating or extrapolating, are to:
    extrapolate the first location information from the first reference signature or the second location information from the second reference signature to provide the location estimate associated with the signature.

15. A non-transitory computer-readable medium storing instructions, the instructions comprising:
    one or more instructions that, when executed by a device, cause the device to:
        obtain a signature associated with a mobile communication unit,
            the signature including identification information of the mobile communication unit, non-radio frequency control information, and a first timestamp,
            the signature not including location information,
        identify a reference signature in a reference signature database based on the identification information,
            the reference signature including first location information, a second timestamp indicating a time before or after the first timestamp, and radio frequency information,
        extrapolate, by the device, the first location information from the reference signature to provide a location estimate associated with the signature,
        create, by the device, a second reference signature by combining information identifying the location estimate and at least a part of the signature,
            the second reference signature being for use in geolocation in a wireless communication system.

16. The non-transitory computer-readable medium of claim 15, where the one or more instructions further cause the device to:
    add the second reference signature to the reference signature database.

17. The non-transitory computer-readable medium of claim 15, where the signature is obtained from a first database that includes signatures that do not include location information, and
    where the reference signature is created by combining another signature from the first database with an anonymized signature of a second database,
        the anonymized signature including the first location information.

18. The non-transitory computer-readable medium of claim 17, where the first database is an Operation Support System database of the wireless communication system.

19. The non-transitory computer-readable medium of claim 15, where the non-radio frequency control information includes at least one of:
    channel quality index information,
    burst rate information, or
    serving cell information.

20. The non-transitory computer-readable medium of claim 15, where the second reference signature includes the identification information of the mobile communication unit, the non-radio frequency control information, and the information identifying the location estimate.

* * * * *